(12) United States Patent
Massicot et al.

(10) Patent No.: US 9,613,480 B2
(45) Date of Patent: Apr. 4, 2017

(54) METHOD AND DEVICE FOR AUTHENTICATING A TAG

(75) Inventors: Jean-Pierre Massicot, Rueil-Malmaison (FR); Zbigniew Sagan, Rueil-Malmaison (FR); Alain Foucou, Rueil-Malmaison (FR)

(73) Assignee: ADVANCED TRACK & TRACE, Rueil-Malmaison (FR)

( * ) Notice: Subject to any disclaimer, the term of this patent is extended or adjusted under 35 U.S.C. 154(b) by 321 days.

(21) Appl. No.: 14/128,837

(22) PCT Filed: Jun. 21, 2012

(86) PCT No.: PCT/FR2012/051413
§ 371 (c)(1),
(2), (4) Date: Dec. 23, 2013

(87) PCT Pub. No.: WO2012/175878
PCT Pub. Date: Dec. 27, 2012

(65) Prior Publication Data
US 2014/0147046 A1 May 29, 2014

(30) Foreign Application Priority Data

Jun. 21, 2011 (FR) ..................... 11 55470
Jun. 21, 2011 (FR) ..................... 11 55472

(51) Int. Cl.
G07D 7/20 (2016.01)
G07D 7/12 (2016.01)
H04M 1/725 (2006.01)
(52) U.S. Cl.
CPC ............ *G07D 7/20* (2013.01); *G07D 7/128* (2013.01); *G07D 7/2066* (2013.01); *H04M 1/72522* (2013.01); *H04M 2250/52* (2013.01)

(58) Field of Classification Search
None
See application file for complete search history.

(56) References Cited

U.S. PATENT DOCUMENTS

2005/0234857 A1* 10/2005 Plutchak ............ G06K 9/00577
2007/0091376 A1 4/2007 Calhoon et al.
(Continued)

FOREIGN PATENT DOCUMENTS

EP 1 014 318 A2 6/2000
EP 1 986 162 A1 10/2008
(Continued)

OTHER PUBLICATIONS

International Search Report, dated Oct. 4, 2012, from corresponding PCT application.

*Primary Examiner* — Vikkram Bali
*Assistant Examiner* — Tracy Mangialaschi
(74) *Attorney, Agent, or Firm* — Young & Thompson

(57) ABSTRACT

A method for authenticating a tag, includes:
a step (205) of capturing an image, with a communicating mobile terminal, of at least a portion of a tag having at least a portion of an identifier;
a step (210) of transmitting the identifier to a server;
a step (215) of reading, from a memory of tag images, the image of a tag having the identifier;
a step (220) of transmitting, to the communicating mobile terminal, at least a portion of the image read from the memory; and
a step (230) of displaying at least a portion of the transmitted image superimposed on an image captured by the terminal.

15 Claims, 8 Drawing Sheets

(56) References Cited

U.S. PATENT DOCUMENTS

2008/0085046 A1* 4/2008 Lee .................. G07D 7/128
                                                382/137
2008/0181447 A1* 7/2008 Adams ................ G09F 3/00
                                                382/100

FOREIGN PATENT DOCUMENTS

| WO | 2004/081649 A2 | 9/2004 |
| WO | 2005/029390 A2 | 3/2005 |

* cited by examiner 29    34

39    44

METHOD AND DEVICE FOR AUTHENTICATING A TAG

RELATED APPLICATIONS

This is the 35 USC 371 national stage of international application from PCT/FR2012/051413 filed on Jun. 21, 2012, which claims priority from French Patent Applications No. 1155470 filed on Jun. 21, 2011 and No. 1155472 filed on Jun. 21, 2011, each of which is herein incorporated by reference in its entirety.

TECHNICAL FIELD OF INVENTION

The present invention relates to a tag for authenticating a product, a method for manufacturing this tag and a method for authenticating a product to which this tag is associated.

BACKGROUND OF THE INVENTION

Tags designed to identify products, for example bearing a barcode, allow a type of product to be identified, but do not allow it to be authenticated, i.e. verify that it is not a copy, in particular because these tags are easy to duplicate.

One knows the authentication methods and devices described in documents WO 2004/081649, US 2007/091376 and EP 1 986 162. Substantial data throughput and computing resources are utilized in each of these methods and devices. In addition, these methods and devices do not allow visual authentication by the user. On the contrary, authentication is performed automatically. It is therefore subject to algorithm errors or to adaptation, by a counterfeiter, to the algorithms utilized.

OBJECT AND SUMMARY OF THE INVENTION

The present invention aims to remedy these drawbacks.

To this end, according to a first aspect, the present invention envisages a method for authenticating a tag, that comprises:

a step of capturing an image, with a communicating mobile terminal, of at least a portion of a tag comprising at least a portion of an identifier;

a step of transmitting said identifier to a server;

a step of reading, from a memory of tag images, the image of a tag having said identifier;

a step of transmitting, to said communicating mobile terminal, at least a portion of the image read from the memory; and a step of displaying at least a portion of the transmitted image superimposed on an image captured by said terminal, the image resulting from the superimposition of images having, in each of these points, a value that depends at the same time on the value of a point of each of the superimposed images.

Thanks to these provisions, the user of the communicating mobile terminal can verify, by himself, a first authentication level of the tag by checking that the transmitted image and the captured image are sufficiently superimposed.

In embodiments, during the display step images are superimposed automatically to minimize a difference between said images.

Thanks to these provisions, no effort is expended by the user for the superimposition to allow the authenticity of the tag to be estimated.

In embodiments, during the display step the two images to be superimposed are set to the same scale and orientation, by identifying characteristic points of the tag in the two images and superimposing these characteristic elements.

In embodiments, during the display step, one of the images is deformed to take the difference in viewpoint into account.

In embodiments, during the display step, one of the images is translated relative to the other so that the automatic superimposition minimizes a difference between the images, point by point.

In embodiments, during the identifier transmission step, the mobile terminal transmits at least a portion of said captured image, the server determining said identifier from the image transmitted by the mobile terminal.

Thanks to these provisions, firstly the communicating mobile terminal does not need to utilize substantial image processing resources and secondly, the algorithm for determining the identifier remains protected on the remote server.

In embodiments, during the identifier transmission step the mobile terminal determines the identifier by processing at least a portion of said captured image and transmits symbols representative of the identifier thus determined.

Thanks to these provisions, the quantity of data to be transmitted from the communicating mobile terminal to the remote server is reduced to the identifier.

In embodiments, during the step of capturing an image, with a communicating mobile terminal, of at least a portion of a tag and during the step of transmitting this identifier to a server, said identifier is comprised of at least a portion of the captured image.

In embodiments, during the step of reading the image of a tag having said identifier from a memory of tag images, at least a portion of the images are automatically superimposed so as to minimize a difference between said images, the image of a tag bearing said identifier being the image for which said difference is minimal.

In embodiments, during the reading step, the two portions of images to be superimposed are set to the same scale and orientation, by identifying characteristic points of the image in both images and superimposing these characteristic elements, and one of the image portions is deformed to take the difference in viewpoint into account so that the automatic superimposition minimizes a difference between the images, point by point.

According to particular features, during the display step, at least a portion of the image transmitted is displayed superimposed on the image captured during the capture step.

Thanks to these provisions, the user does not need to capture another image of the tag.

According to particular features, during the display step, at least a portion of the image transmitted is displayed superimposed on an image captured after the step of transmitting at least a portion of image.

Thanks to these provisions, the user can adjust the image capture after receiving the image read into memory such that the image displayed by superimposition with the image read into memory is the most similar to this image read into memory.

According to a second aspect, the present invention envisages a device for authenticating a tag by a communicating mobile terminal, that comprises:

a means of capturing an image of at least a portion of a tag comprising at least a portion of an identifier;

a means of transmitting said identifier to a server;

a means for the reception by the server of at least a portion of the image read from the memory; and a means of displaying at least a portion of the transmitted image superimposed on an image captured by said terminal, the image resulting from the superimposition of images having, in each of these points, a value that depends at the same time on the value of a point of each of the superimposed images.

In embodiments, the display means is designed to automatically superimpose images to minimize a difference between said images.

In embodiments, the display means is designed to identify characteristic points of the tag in the two images, to superimpose these characteristic elements and to set the two images to be superimposed to the same scale and orientation.

In embodiments, the display means is designed to deform one of the images to take the difference in viewpoint into account.

In embodiments, the display means is designed to translate one of the images relative to the other so that the automatic superimposition minimizes a difference between the images, point by point.

As the particular features, advantages and aims of this device are similar to those of the method that is the subject of the present invention, they are not repeated here.

According to a third aspect, the present invention envisages a method for manufacturing authentication tags, that comprises a step of determining, for different groups of tags, different positions and, for each of the different groups of tags:
 a step of marking a design bearing authentication elements; and
 a step of forming a set of points arranged on interwoven lines, said lines having positions that are a function of the position determined during the step of determining positions.

Thanks to these provisions, reproduction of the set of points is particularly complex because, when a tag is copied to produce falsified tags, the positions of the points are dispersed and no longer correspond to a clear line and, secondly, the copies of the tag are identical and do not present the required diversity of positions.

In embodiments, during the step of determining positions at least two production cylinders are utilized whose circumferences represent two different numbers of tags, one of said cylinders being designed to cut tags and another of said cylinders being designed to form said sets of points.

The number of positions is therefore the smallest common multiple of the number of tags represented by the cylinders utilized.

According to a fourth aspect, the present invention envisages a device for manufacturing authentication tags, that comprises:
 a means of determining different positions for different groups of tags; and
 a means of marking designed, for each of the different groups of tags:
  to form, on each tag, a design bearing authentication elements; and
  to form, on each tag, a set of points arranged on interwoven lines, said lines having positions that are a function of the position determined during the positions determination step.

According to a fifth aspect, the present invention envisages an authentication tag, that comprises:
 a design bearing authentication elements; and
 a set of points arranged on interwoven lines, said lines having positions that can vary between different tags.

As the particular features, advantages and aims of this device are similar to those of the method that is the subject of the third aspect of the present invention, they are not repeated here.

According to a sixth aspect, the present invention envisages a method for manufacturing authentication tags and of associating a signature to each of said tags, that comprises:
 a step of forming at least one hologram or diffractive element on each said tag; and
 for each tag:
  a step of capturing an image of a plurality of holograms or diffractive elements borne by said tag;
  a step of determining the position of a characteristic element of a plurality of holograms or diffractive elements borne by said tag; and
  a step of memorizing an item of information representative of the respective positions of characteristic elements of holograms or diffractive elements.

Thanks to these provisions, a signature of the tag can be determined and memorized, a signature formed of respective offsets of holograms or diffractive elements formed on said tag.

In embodiments, the characteristic element of each hologram or diffractive element is the center of gravity of its surface.

Thanks to these provisions, the characteristic element is not very sensitive to deteriorations of the tag or to image capture problems.

In embodiments, the characteristic element of each hologram or diffractive element is the center, each said hologram or diffractive element forming a disk.

Thanks to these provisions, the characteristic element is not very sensitive to deteriorations of the tag or to image capture problems, since missing disk elements can be reconstituted.

In embodiments, each said hologram or diffractive element is formed separately from at least one other hologram or diffractive element.

Thanks to these provisions, the respective positions of characteristic elements of holograms or diffractive elements are subject to uncertainty linked to the positioning tolerances of the groups of holograms or diffractive elements.

According to a seventh aspect, the present invention envisages a device for manufacturing authentication tags and of associating a signature to each of said tags, that comprises:
 a means of forming at least one hologram or diffractive element on each said tag;
 a means of capturing an image of a plurality of holograms or diffractive elements borne by each said tag;
 a means of determining the position of a characteristic element of a plurality of holograms or diffractive elements borne by said tag; and
 a means of memorizing an item of information representative of the respective positions of characteristic elements of holograms or diffractive elements.

As the particular features, advantages and aims of this device are similar to those of the method that is the subject of the sixth aspect of the present invention, they are not repeated here.

According to an eighth aspect, the present invention envisages a method for manufacturing authentication tags and of associating a signature to each of said tags, that comprises:
 a step of forming at least one identification element on a substrate to be cut out to form each said tag; and
  for each tag:

a step of cutting out the substrate so that the cut-out cuts across at least one said identification element;

a step of capturing at least the cut-out area of at least one identification element cut during said cut-out step; and a step of memorizing an item of information representative of the captured image of the cut-out area.

Thanks to these provisions, a signature of the tag can be determined and memorized, a signature formed of the position of the cut-out of at least one identification element. In addition, the position, angle and form of the cut, which are subject to uncertainty linked to the positioning tolerances, serve to create a signature that is difficult to reproduce.

In embodiments, at least one identification element cut out during the cut-out step is a copy-protection mark.

In embodiments, the memorization step comprises a step of determining a difference of cut-out position between at least two portions of an identification element.

In embodiments, at least one identification element comprises successive parallel lines, the memorization step comprises a step of determining at least one number of lines of said identification mark remaining on the tag after the cut.

In embodiments, during the cut-out step at least two production cylinders are utilized whose circumferences represent two different numbers of tags, one of said cylinders being designed to form at least one identification element and another of said cylinders being designed to cut tags.

The number of random positions is thus again multiplied by the smallest common multiple of the number of tags represented by the cylinders utilized.

According to a ninth aspect, the present invention envisages a device for manufacturing authentication tags and of associating a signature to each of said tags, that comprises:

a means of forming at least one identification element on a substrate to be cut out to form each said tag;

a means of cutting out the substrate so that the cut-out cuts across at least one said identification element; and a means of determining a signature designed, for each tag:
to capture at least the cut-out area of at least one identification element cut during said cut-out step; and
to memorize an item of information representative of the captured image of the cut-out area.

According to a tenth aspect, the present invention envisages a method for authenticating a tag, that comprises:

a step of a communicating mobile terminal capturing an image of at least a portion of a tag comprising at least a portion of an identification element touching the edge of the tag;

a step of transmitting this identification element to a server;

a step of reading, from a memory of tag images, the image of a tag having said identification element;

a step of transmitting, to said communicating mobile terminal, at least a portion of the image read from the memory; and a step of displaying at least a portion of the transmitted image superimposed on an image captured by said terminal.

Thanks to these provisions, the user of the communicating mobile terminal can verify, by himself, a first authentication level of the tag by checking that the transmitted image and the captured image are sufficiently superimposed.

In embodiments, during the identification element transmission step, the mobile terminal transmits at least a portion of said captured image, the server determining the identification element's value from the image transmitted by the mobile terminal.

Thanks to these provisions, firstly the communicating mobile terminal does not need to utilize significant image processing resources and, secondly, the algorithm for determining the identification element remains protected on the remote server.

In embodiments, during the identifier transmission step, the mobile terminal determines the identification element's value by processing at least a portion of said captured image and transmits symbols representative of the identification element's value thus determined.

Thanks to these provisions, the quantity of data to be transmitted from the communicating mobile terminal to the remote server is reduced to the identifier.

In embodiments, during the display step, at least a portion of the image transmitted is displayed superimposed on the image captured during the capture step.

Thanks to these provisions, the user does not need to capture another image of the tag.

In embodiments, during the display step, at least a portion of the image transmitted is displayed superimposed on an image captured after the step of transmitting at least a portion of image.

Thanks to these provisions, the user can adjust the image capture after receiving the image read into memory such that the image displayed by superimposition with the image read into memory is the most similar to this image read into memory.

In embodiments, during the display step, at least one of the superimposed images is a ghost image, the image resulting from the superimposition of images having, in each of these points, a value that depends at the same time on the value of a point of each of the superimposed images.

Thanks to these provisions, the comparison of the images by the user is more visual.

In embodiments, during the display step images are superimposed automatically to minimize a difference between said images.

Thanks to these provisions, no effort is expended by the user for the superimposition to allow the authenticity of the tag to be estimated.

According to an eleventh aspect, the present invention envisages a tag comprising a cut identification element at the edge of the tag.

As the particular features, advantages and aims of this device, this authentication method and this tag are similar to those of the method that is the subject of the eighth aspect of the present invention, they are not repeated here.

The different aspects of the present invention are complementary for achieving the objectives of the present invention and are therefore intended to be combined.

BRIEF DESCRIPTION OF THE DRAWINGS

Other advantages, aims and particular features of the present invention will become apparent from the description that will follow, made, as a non-limiting example, with reference to the drawings included in an appendix, in which.

DETAILED DESCRIPTION OF EMBODIMENTS

Figure 1:
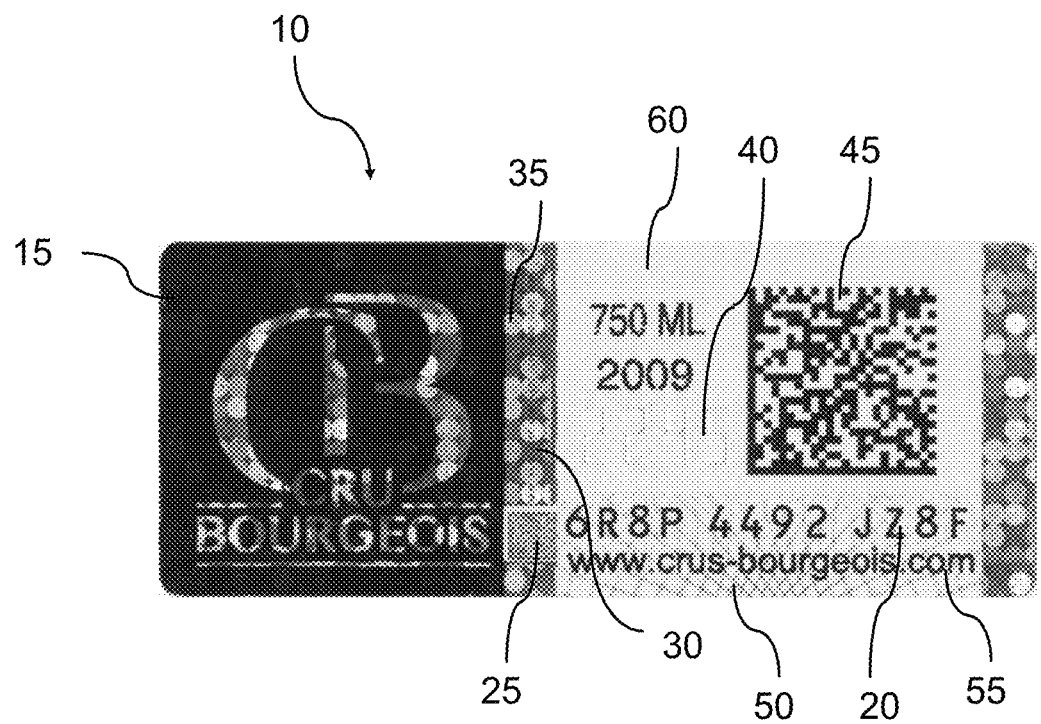
FIG. 1 represents a first tag formed according to the manufacturing method that is the subject of the present invention.
Figure 2:
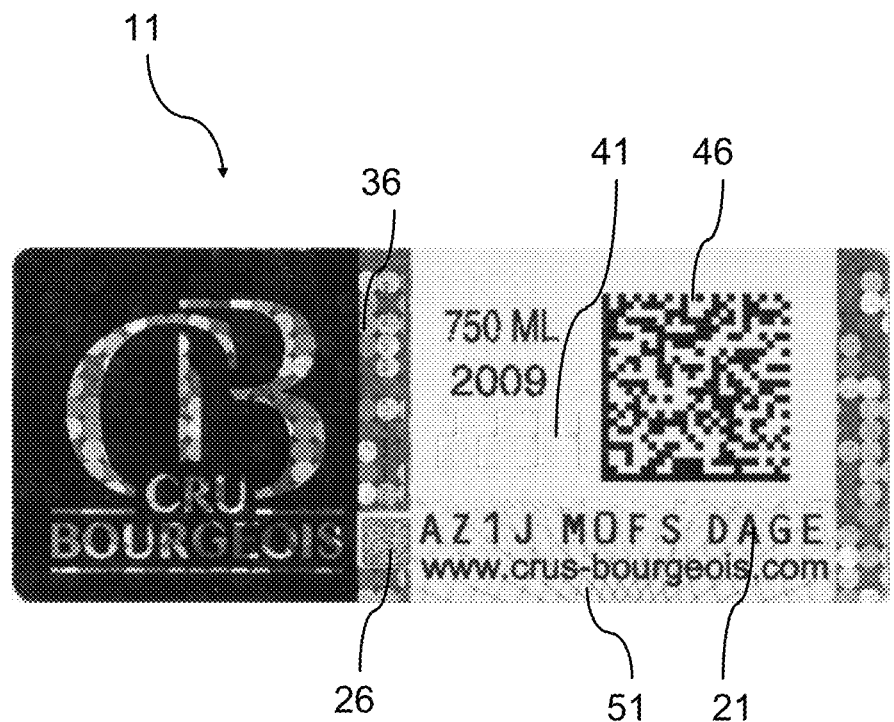
FIGS. 2 to 4 represent other tags formed according to the manufacturing method that is the subject of the present invention.
Figure 3:
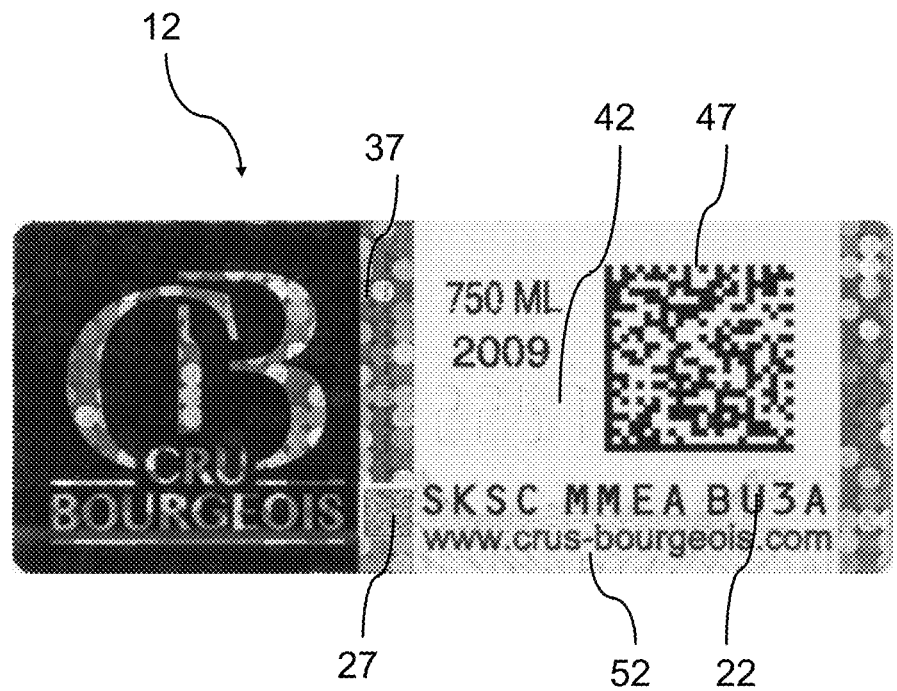
Figure 4:
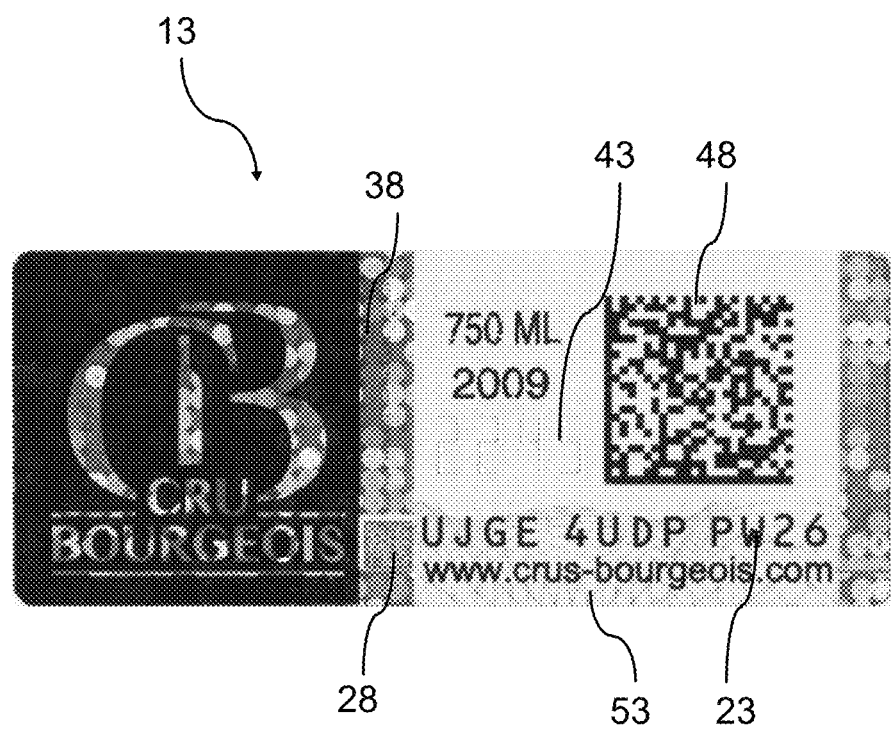

FIG. 1 shows a tag 10 that is the subject of the invention and bearing on its surface that is not intended to be attached to a product (not shown) to be authenticated, an area 15 of visual identification for a product, a sequence 20 of alphanumeric symbols legible to the naked eye, an anti-copy mark visible to the naked eye 25, microwriting of alphanumeric characters 30, a hologram or clear diffractive elements area 35, an anti-copy mark invisible to the naked eye 40, a two-dimensional barcode 45, an indication of a source of information 50 about the product and geometric patterns 55.

The product to be authenticated is of any type. In the embodiment shown in FIG. 1, the visual identification of the product in area 15 represents a "Cru Bourgeois", i.e. a bottle of wine, a year representing a vintage, here 2009, and a capacity, here 750 ml. These indications are printed. The tag 10 is designed to be glued on the container or packaging of the product such that detaching it without chemical products causes a visible deterioration of the tag 10.

The whole of the tag 10 bears holograms or diffractive elements 35, here circular, covered partially by the marks 15, 20, 25, 30, 40, 45, 50 and 55. In particular, a white background 60, masking the holograms or diffractive elements, is interposed between these holograms or diffractive elements and the printed marks 20, 25, 40, 45, 50 and 55.

The sequence 20 of alphanumeric symbols represents, by encoding, firstly an item of information that can vary from one tag to another, preferably unique for each tag, and an identifier of the equipment manufacturing the tag 10. The person skilled in the art can utilize different types of different number generators and different types of reversible encodings to obtain this sequence of symbols 20. These types of generators and encodings are therefore not detailed here.

The anti-copy mark visible to the naked eye 25 is a mark comprising details that are degraded in the event of copying and whose degradation is measurable. For example, the degradation is measured by comparing the image of the anti-copy mark with an image of the original mark. According to another example, the anti-copy mark 25 represents a sequence of symbols with an error correction code ("CRC") and counting the number of error corrections to be performed gives a measurement, or score, which, by comparing to a limit value, indicates whether the anti-copy mark is an original mark or a copy.

The microwriting of alphanumeric characters 30 represents a message legible with an optical instrument. The degradation of the microwriting makes it possible, with this optical instrument, to evaluate with the eye whether the tag is an original tag or a copy. In embodiments the sequence of symbols 20 is reproduced, possibly duplicated, in the microwriting 30.

The holograms or clear diffractive elements 35 preferably represent the same geometric shape, here disks. A characteristic point of this geometric shape, here its center, represents, with the identical points of other holograms or diffractive elements 35, a distribution of almost aligned points. Successive offsets of characteristic points relative to a straight line, respectively vertical or horizontal, supply a signature allowing the tag 10 or a batch of tags 10 to be identified.

The anti-copy mark invisible to the naked eye 40 is a distribution of points of low contrast against the background, each point being separated from the other points of this distribution. Preferably:

the centers of points are offset from each other by a value which is not a multiple of the dimensions of these points but a multiple of a fraction of the dimensions of these points;

the values of the differences of the vertical and horizontal dimensions of these points are not a multiple of the smallest of these dimensions but a multiple of a fraction of this smallest dimension; and/or the values of the differences between the vertical and/or horizontal dimensions of these points are not a multiple of the minimum dimension of these points, respectively vertical or horizontal, but a multiple of a fraction of the minimum dimension.

The fractions considered here are ½, ⅓, ¼ or ⅕. Preferably, the multiples of these fractions are uniformly present in the mark 40.

The two-dimensional barcode 45 bears an item of generic or unitary identification information about the product. For example, the barcode 45 is a Data Matrix (registered trademark).

The information source indication 50 allows a user or consumer of the product to find out about this product. In the embodiment shown, the indication 50 is an electronic address of a page of a website (www.crus-bougeois.com)

The geometric patterns 55 are formed of points distributed along geometric lines. The position of the geometric patterns is variable between different tags 10 to 14. To this end, during the manufacture of the tags, cut-out and printing cylinders are utilized that preferably have different numbers of placements. For example, with 114 placements on the cut-out cylinder and 144 positions on the printing cylinder, a number of different positions is generated that is equal to the smallest common multiple of these numbers, i.e. approximately 2700 different positions.

Preferably, the content of the sequence 20 of alphanumeric symbols legible to the naked eye, of the anti-copy mark visible to the naked eye 25, anti-copy mark invisible to the naked eye 40 and of the two-dimensional barcode 45 are synchronized, i.e. representative of at least one common item of information. FIGS. 1 to 4 show that each of these protection elements varies.

In this way, the generation of a false sequence, a false anti-copy mark and/or a false barcode can be detected by a simple search (reading and decoding) of this common item of information.

Figure 5:
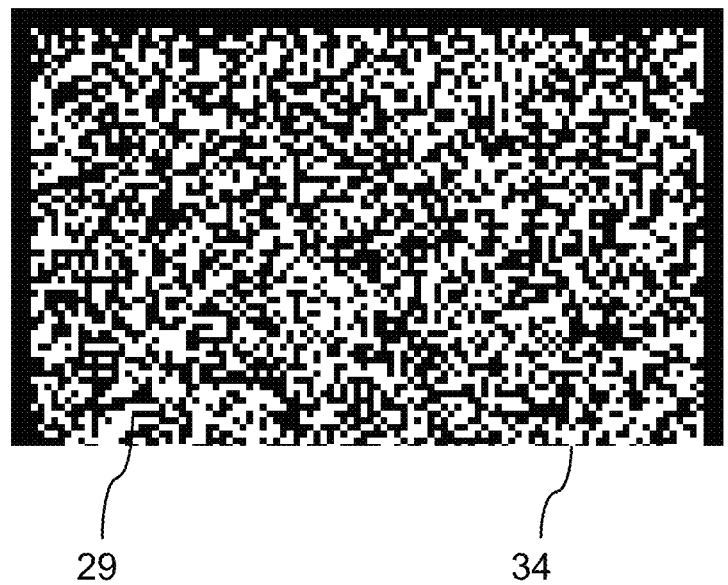
FIGS. 5 to 6 represent details of tags formed according to a particular embodiment of the manufacturing method that is the subject of the present invention.
Figure 6:
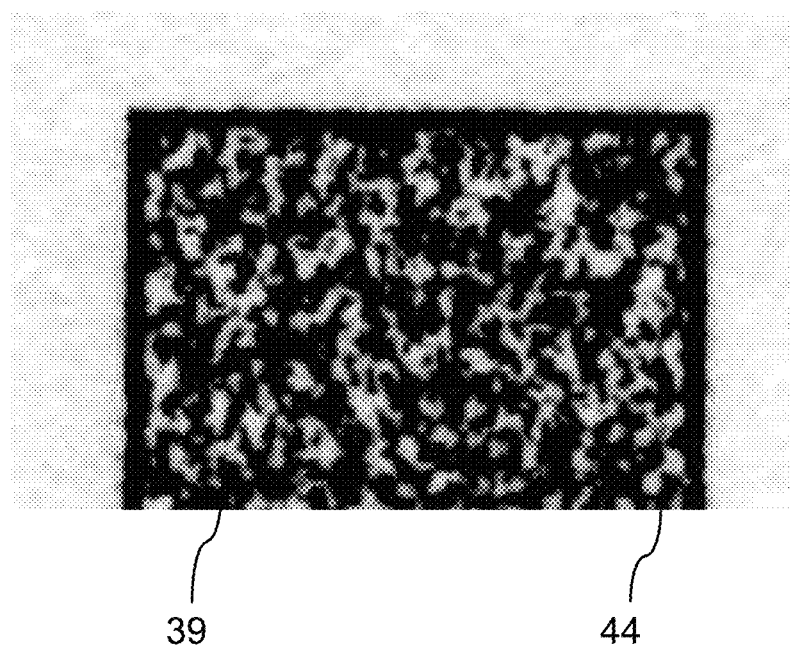

FIGS. 5 and 6 show an anti-copy mark visible to the naked eye 29 (respectively 39) cut during the cutting out of the tag. The cutting line 34 (respectively 44) cuts at least one line of the anti-copy mark. In FIG. 5, this cutting line only cuts one line whereas in FIG. 6, several lines are cut because the cutting line 44 is not parallel to the lines of the anti-copy mark 39.

Figure 7:
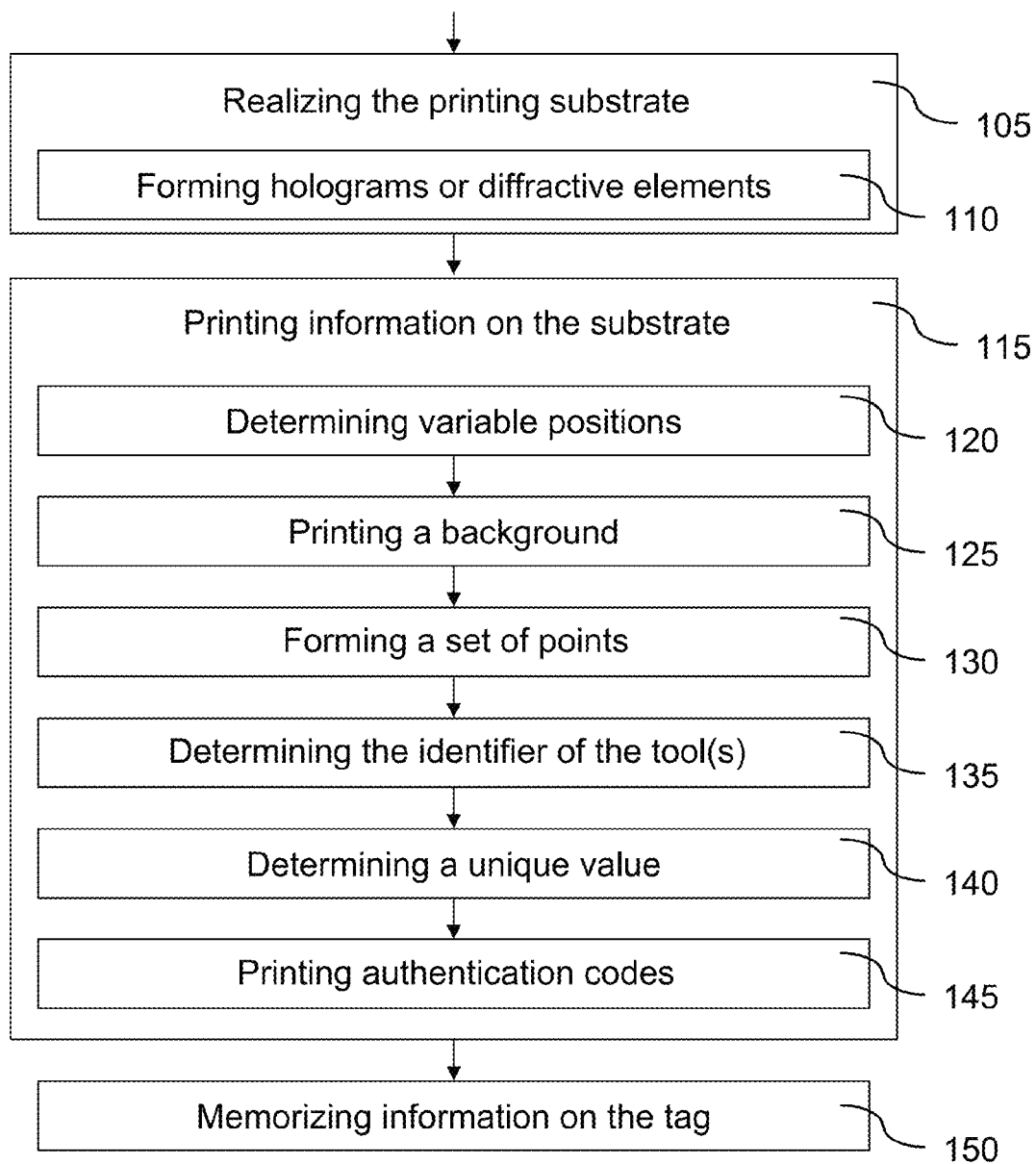
FIGS. 7 and 8 represent, in the form of a logical diagram, steps utilized in a particular embodiment of the method for manufacturing tags that is the subject of the present invention.

As FIG. 7 shows, in a particular embodiment of the method for manufacturing tags that is the subject of the present invention, during a step 105, a printing substrate is realized, during a step 115, a step of printing information on said substrate is performed and, during a step 150, information representative of the tag is memorized.

The tag 10 is designed to be glued on the container or packaging of the product such that detaching it without chemical products causes a visible deterioration of the tag 10. To this end, the printing substrate initially takes the form of a plastic band coated with adhesive, the adhesive of which is protected by a film designed to be easily separated from the adhesive. Alternatively, the application of and protection of the adhesive are performed after manufacturing a band of tags, before they are cut.

Step 105 comprises a step 110 of forming at least one hologram on each said tag. Preferably, each hologram or diffractive element is formed separately from at least one other hologram or diffractive element and, more preferably, from a plurality of other holograms or diffractive elements or even from all the other holograms or diffractive elements.

Step 115 comprises a step 120 during which, for different groups of tags, different positions are determined. Preferably, during the step 120 of determining positions, at least two production cylinders are utilized whose circumferences represent two different numbers of tags, one of said cylinders being designed to cut tags and another of said cylinders being designed to form said sets of points.

The whole of the tag 10 thus bears the holograms or diffractive elements 35, covered partially by the marks 15, 20, 25, 30, 40, 45, 50 and 55. In particular, a white background 60, masking the holograms or diffractive elements, is interposed between these holograms or diffractive elements and the printed marks 20, 25, 40, 45, 50 and 55 before step 125.

Then, for each of the different groups of tags, there is performed:
- a step 125 of printing a background to be printed, here a white background; and
- a step 130 of forming a set of points 55 arranged on interwoven lines, said lines having positions that are a function of the position determined during the position determination step.

The geometric patterns 55 are formed of points distributed along geometric lines. The position of the geometric patterns is variable between different tags. Preferably, cut-out and printing cylinders are utilized that have different numbers of placements. For example, with 114 placements on the cut-out cylinder and 130 positions on the printing cylinder, a number of different positions is generated that is equal to the smallest common multiple of these numbers, i.e. 7410 different positions.

During a step 135, at least one identifier of the tag manufacturing equipment is determined. During a step 140, a unique value is determined for the tag and, by encoding this unique value and the identifier of at least one manufacturing tool, the values of the sequence 20, the mark 25, the characters 30, the mark 40 and the two-dimensional barcode 45. In particular, the sequence 20 of alphanumeric symbols thus represents, by encoding, firstly an item of information that can vary from one tag to another, preferably unique for each tag, and an identifier of the equipment manufacturing the tag 10. The values of the other identification elements, 25, 30, 40 and 45, may not depend on the identifier of the manufacturing equipment.

During a step 145, for each tag that is the subject of the invention, one prints, on its surface that is not intended to be attached to a product to be authenticated, the area 15 of visual identification for a product, the indication of a source of information 50 about the product and the tag's authentication codes. The authentication codes comprise the sequence 20 of alphanumeric symbols legible to the naked eye, the anti-copy mark visible to the naked eye 25, the microwriting of alphanumeric characters 30, the anti-copy mark invisible to the naked eye 40, the two-dimensional barcode 45.

Figure 8:
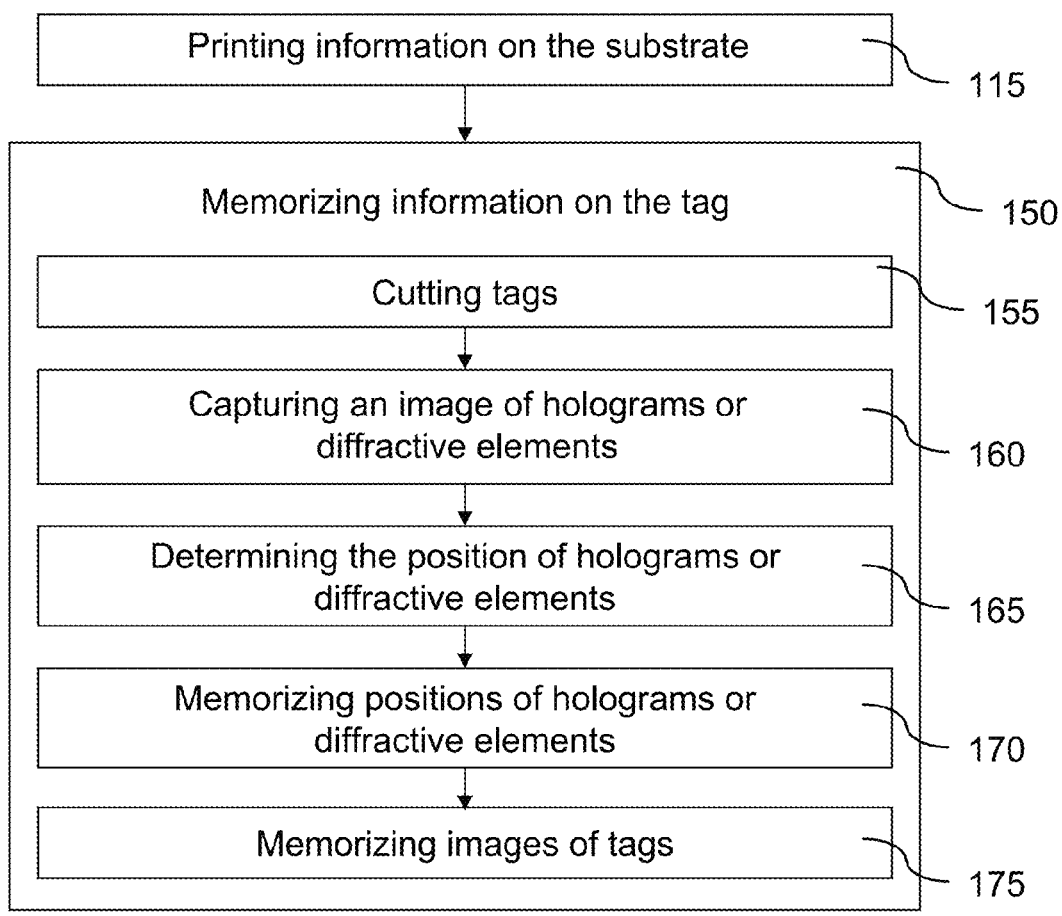

During step 150 (FIG. 8), for each tag, one performs:
- a step 155 of cutting out the tag;
- a step 160 of capturing an image of a plurality of holograms or diffractive elements borne by said tag, for example with a linear camera;
- a step 165 of determining the position of a characteristic element of a plurality of holograms or diffractive elements borne by said tag; and
- a step 170 of memorizing an item of information representative of the respective positions of characteristic elements of holograms or diffractive elements.

In embodiments, during step 160, the characteristic element of each hologram or diffractive element is the center of gravity of its surface and, in the case wherein each hologram or diffractive element takes the form of a disk, the center of this disk.

During a step 175, the images of tags are memorized in a database.

Figure 9:
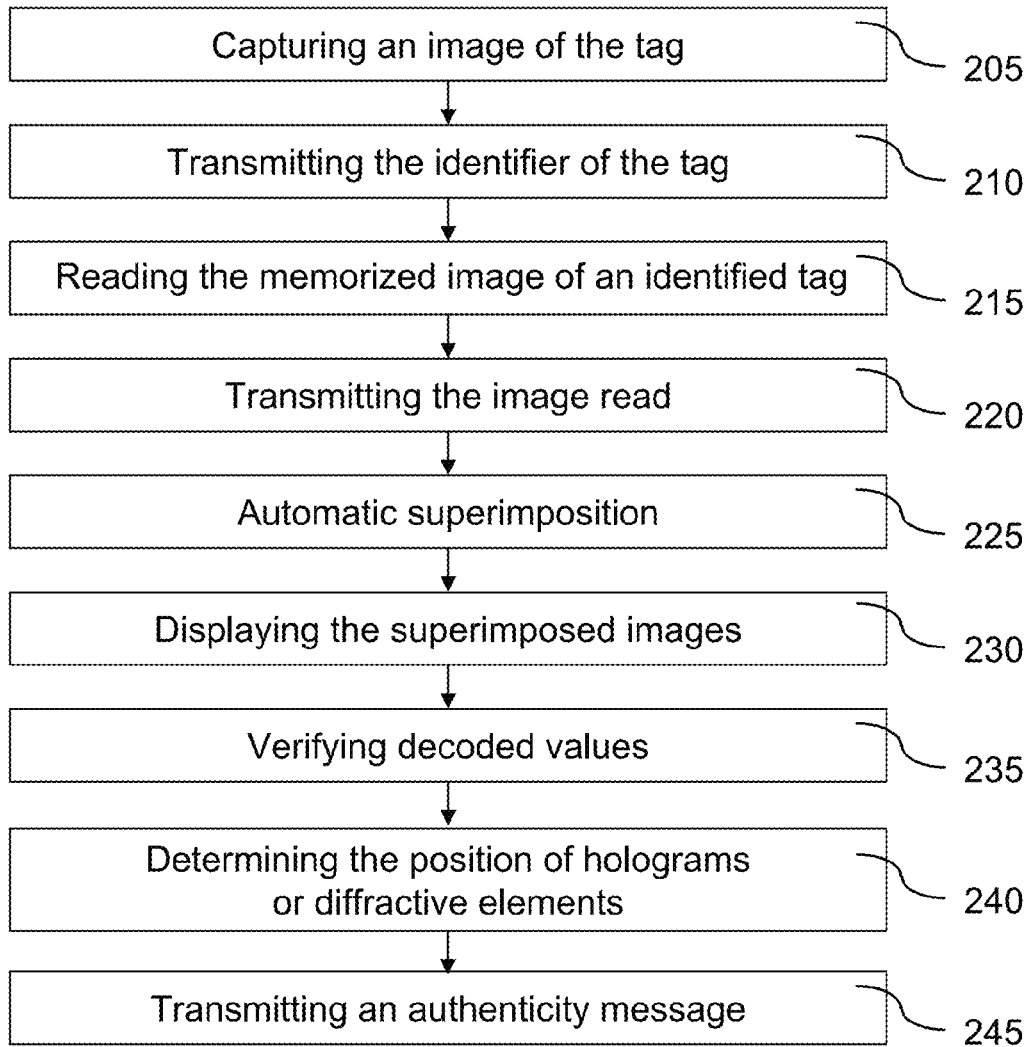
FIG. 9 represents, in the form of a logical diagram, steps utilized in a particular embodiment of the method for authenticating a tag that is the subject of the present invention.

As shown in FIG. 9, in a particular embodiment, for the authentication of a tag that is the subject of the present invention, first, a step 205 is performed of capturing an image, with a communicating mobile terminal, of at least a portion of a tag comprising at least a portion of an identifier.

During a step 210, the communicating mobile terminal transmits this identifier to a remote server, for example by means of a mobile telephone network.

In embodiments, during the step 210 of transmitting the identifier, the mobile terminal transmits at least a portion of said captured image, the server determining the identifier from the image transmitted by the mobile terminal, for example by utilizing Optical Character Recognition (known as OCR). In other embodiments, it is the communicating mobile terminal that determines the value of the identifier by processing at least a portion of said captured image and transmits symbols representative of the identifier thus determined.

During a step 215, the server reads, from a memory of tag images, the image of a tag having said identifier.

During a step 220, the server transmits to the communicating mobile terminal at least a portion of the image read from the memory.

During a step 230, the communicating mobile terminal displays at least a portion of the transmitted image superimposed on an image captured by said terminal.

In embodiments, during the display step 230, at least a portion of the image transmitted is displayed superimposed on the image captured during the capture step. In embodiments, during the display step 230, at least a portion of the image transmitted is displayed superimposed on an image captured after the step of transmitting at least a portion of image. In embodiments, during the display step 230, at least one of the superimposed images is a ghost image, the image resulting from the superimposition of images having, in each of these points, a value that depends at the same time on the value of a point of each of the superimposed images.

In embodiments, either at the server when, during step 210, the image has been transmitted, or at the communicating mobile terminal, images are superimposed automatically during a step 225.

For example, the two images are set to the same scale and orientation, by identifying characteristic points of the tag in the two images and superimposing them. Possibly, one of the images is deformed to take the difference of viewpoint into account, in particular in the case wherein the tag is not flat once placed.

Then, one of the images is translated relative to the other so that the automatic superimposition minimizes a difference between the images, point by point. Thus the residual differences are clearly apparent to the user of the communicating mobile terminal and this user can quickly form an opinion concerning the authenticity of the product bearing the tag.

Thus, thanks to the database of tag images, in a phase of checking by a user with a simple mobile telephone that sends an image of the tag, the server can read the two-dimensional barcode and send the telephone the complete image of the tag together with the zoom of an area comprising a portion of the random alphanumeric chain, the detail of the set of points 55, and the number of the cutting tool specific to this tag, i.e. three items of visual information that correspond to three elements that can vary between different tags. With this visual information, the user can directly verify that the tag is authentic.

In embodiments, based on the image transmitted during step 235, the server performs additional processing on the images and tags read in this image to determine the tag's authenticity. In particular, during step 235, after decoding the correspondence of the values of the sequence 20, mark 25, characters 30, mark 40 and two-dimensional barcode 45 are checked. In addition, during a step 240, the positions of the holograms or diffractive elements 35 are determined and their distances to regularly spaced positions on the tag are compared with the positions memorized during step 180. Depending on the result of this comparison, i.e. by comparing the sum of the distances of positions memorized and determined based on the image received to a predefined limit value, it is determined whether the tag is authentic and a message representing the tag's authenticity is sent to the communicating mobile terminal during a step 245.

Figure 10:
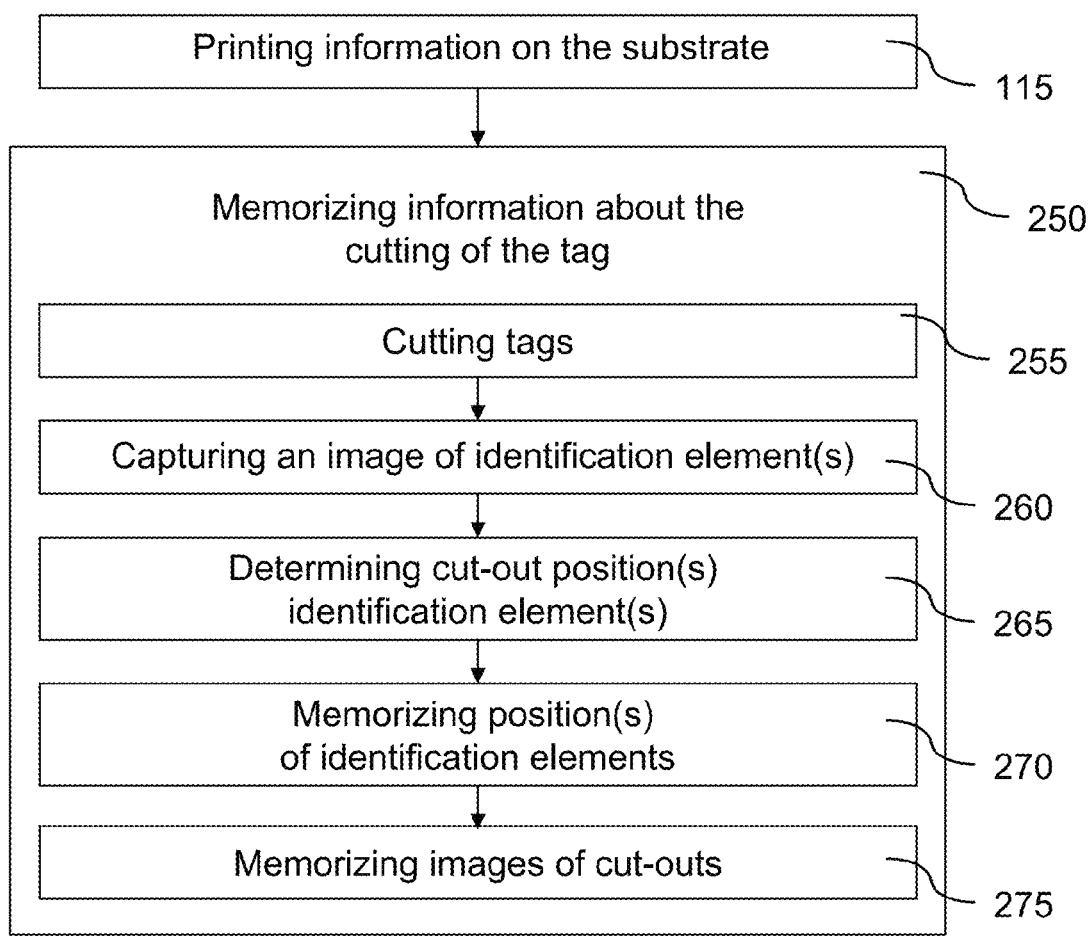
FIG. 10 represents, in the form of a logical diagram, steps utilized in a particular embodiment of the method for manufacturing tags that is the subject of the present invention.

FIG. 10 shows that after step 115 of printing information on the substrate to be cut to form the tags, in particular of printing the anti-copy mark visible to the naked eye, a step 250 is performed of memorizing information relating to the cutting of the tag.

During step 250, for each tag, one performs:
- a step 255 of cutting the tag during which at least one identification element, preferably an anti-copy mark, is cut;
- a step 260 of capturing an image of at least a cut portion of an identification elements born by said tag, for example with a linear camera;
- a step 265 of determining a signature of the tag cut;
- a step 270 of memorizing an item of information representative of the signature of the cut of the identification element; and
- a step 275 of memorizing the image of the cut portion of the identification element in a database.

In embodiments, during step 265, the signature can depend on the position, angle and form of the cut, which are subject to uncertainty linked to the positioning tolerances, serving to create a signature that is difficult to reproduce. In variants, during step 265, a difference of cut-out position between at least two portions of an identification element, for example the two extremities of an anti-copy mark, is determined. In variants, during step 265, when at least one identification element comprises successive parallel lines, at least one number of lines of said identification mark remaining on the tag after the cut is determined. The number of lines may be the minimum number, at one of the extremities of the identification element, the maximum number, at the other extremity, or the average number between these two numbers.

In variants, during step 255 at least two production cylinders are utilized whose circumferences represent two different numbers of tags, one of said cylinders being designed to form at least one identification element and another of said cylinders being designed to cut tags. By providing for a respective displacement of the cutting line and tags, the number of random positions is thus again multiplied by the smallest common multiple of the number of tags represented by the cylinders utilized.

It is noted that all the steps shown in FIG. 10 apply equally to a user's determination of authenticity based on an identification element located entirely on the tag as to that based on a cut identification element, the latter case making it even better for the user of the communicating mobile device to determine whether the tag is authentic.

Figure 11:
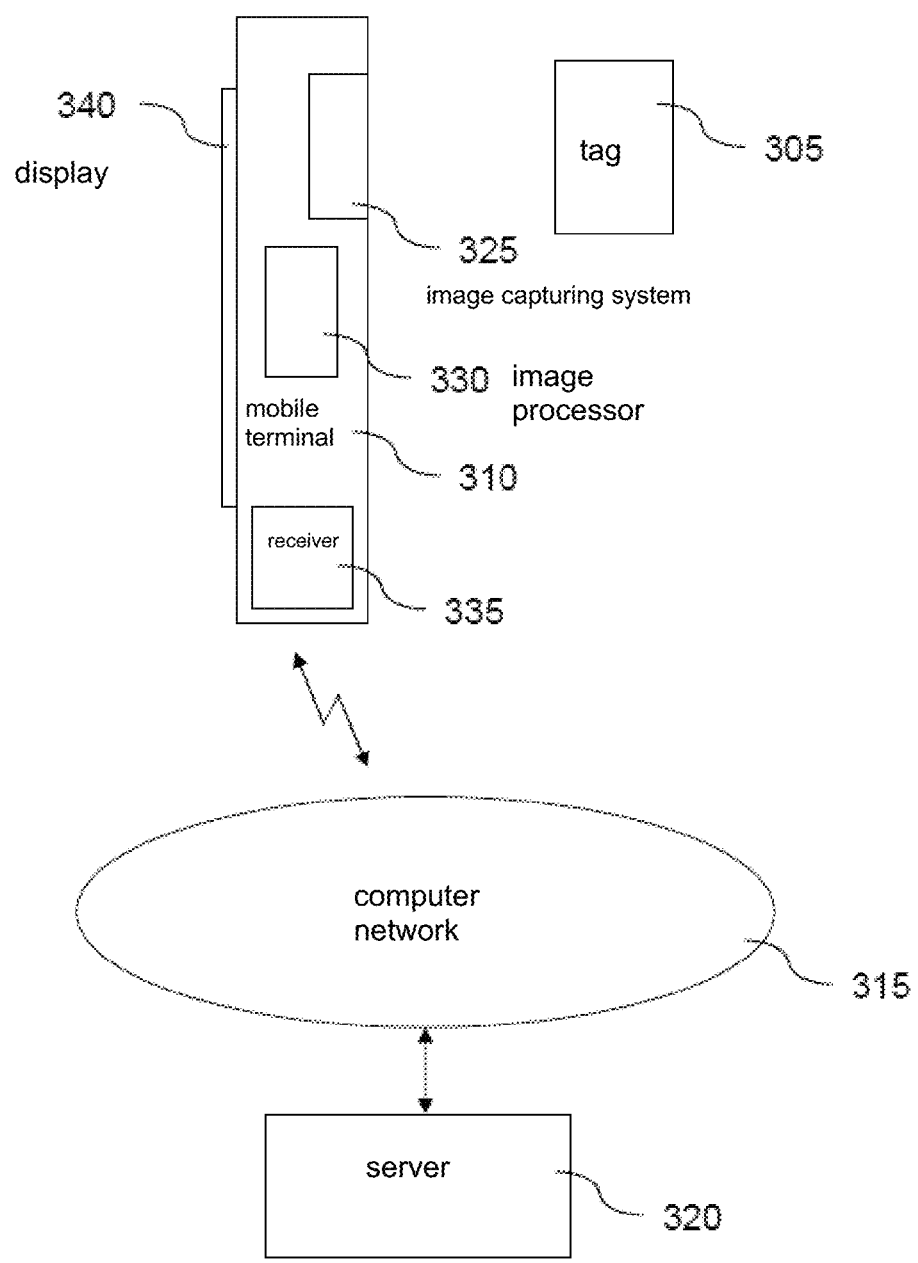
FIG. 11 represents means utilized to use the method that is the subject of the present invention.

FIG. 11 shows a tag 305, a communicating mobile terminal 310, a computer network 315 and a server 320. The tag 305 is as presented in the rest of the description. The communicating mobile terminal 310 is used by the user who wishes to authenticate a product bearing the tag 305. For example, the communicating mobile terminal 310 is a "smartphone". The communicating mobile terminal comprises a means of image capture 325 that the user places in front of the tag 305, an image processing means 330, a hertzian emitter 335 and a display screen 340.

The computer network 315 is, for example, a combination of a wireless telecommunications network and an Internet network. The server 320 communicates with the communicating mobile terminal 310 by means of the computer network 315.

The image processing means 330 and the server 320 are configured to share the steps of the different aspects of the method described with reference to FIGS. 1 thru 10.

In embodiments, the communicating mobile terminal 310 comprises:
- a means of capturing 325 an image of at least a portion of a tag comprising at least a portion of an identifier;
- a means of transmitting 335 this identifier to the server 320;
- the means of the reception 335, by the server 320, of at least a portion of an image read from the memory of the server 320 and corresponding to the identifier transmitted to the server 320; and
- the means, comprised of the image processing means 330 and the display 340, of displaying at least a portion of the transmitted image superimposed on an image captured by said terminal, the image resulting from the superimposition of images having, in each of these points, a value that depends at the same time on the value of a point of each of the superimposed images.

It is noted that the identifier can be a portion or all of the captured image or symbols read in the captured image. It is also noted that the superimposition can be performed with the image captured initially or with an image captured after receiving the image from the server 320.

In embodiments, the image processing means 330 and the display screen 340, which thus comprise the display means, are designed to automatically superimpose images to minimize a difference between said images.

In embodiments, the image processing means 330 and the display screen 340, which thus comprise the display means, are designed to identify characteristic points of the tag in the two images, to superimpose these characteristic elements and to set the two images to be superimposed to the same scale and orientation.

In embodiments, the image processing means 330 and the display screen 340, which thus comprise the display means, are designed to deform one of the images to take the difference in viewpoint into account.

In embodiments, the image processing means 330 and the display screen 340, which thus comprise the display means, are designed to translate one of the images relative to the other so that the automatic superimposition minimizes a difference between the images, point by point.

In embodiments, for transmitting the identifier, the mobile terminal 310 determines the identifier by processing at least a portion of said captured image and transmits symbols representative of the identifier thus determined. In this way, the data throughput required for communication between the terminal 310 and the server 320 is reduced.

In embodiments, for transmitting the identifier, the mobile terminal 310 transmits at least a portion of said captured image, the server 320 determining said identifier from the image transmitted by the mobile terminal. In this way, the resources required by the terminal 310 and, in particular, by the image processing means 330 are reduced.

In embodiments, for transmitting the identifier, the mobile terminal 310 determines the identifier by processing at least a portion of said captured image and transmits symbols representative of the identifier thus determined.

In embodiments, for transmitting said identifier to a server, said identifier is comprised of a portion of the captured image.

In embodiments, during the step 215 of reading the image of a tag having said identifier from a memory of tag images, the server automatically superimposes at least a portion of the images so as to minimize a difference between said images, the image of a tag bearing said identifier being the image for which said difference is minimal.

In embodiments, during the reading step 215 the server sets the two portions of images to be superimposed to the same scale and orientation, by identifying characteristic points of the image in both images and superimposing these characteristic elements, and one of the image portions is deformed to take the difference in viewpoint into account so that the automatic superimposition minimizes a difference between the images, point by point.

The invention claimed is:

1. A method for authenticating a current tag, the method comprising:
   capturing a current image, with a communicating mobile terminal, of at least a portion of the current tag, the captured current image comprising at least a portion of an identifier visible to the naked eye, printed on the tag, the identifier being disposed over at least two hologram elements or diffractive elements;
   transmitting the captured current image including said identifier to a server;
   reading, from a memory of tag images, a previously-stored image of a previously-captured tag having a same identifier as the identifier of the current tag;
   determining the distances of each hologram element or diffractive element to regularly-spaced positions on the previously-captured tag, at the server;
   comparing the determined distances to distances of each hologram element or diffractive element to regularly-spaced positions on the image captured by the terminal;
   transmitting, to said communicating mobile terminal, at least a portion of the previously-stored image read from the memory and the result of the comparison; and
   displaying at least a portion of the transmitted portion of the previously-stored image superimposed on the current image captured by said terminal, a superimposition image resulting from a superimposition of the current image and the transmitted portion of the previously-stored image on a point-to-point basis.

2. The method according to claim 1, wherein, during the displaying, the current image and the transmitted portion of the previously-stored image are superimposed automatically to minimize a difference between the current image and the transmitted portion of the previously-stored image.

3. The method according to claim 1, wherein, during the displaying, the current image and the transmitted portion of the previously-stored image to be superimposed are set to a same scale and orientation, by identifying characteristic points of the previously-captured tag and the current tag in the current image and the transmitted portion of the previously-stored image and superimposing the characteristic points.

4. The method according to claim 1, wherein, during the displaying, one of the current image and the transmitted portion of the previously-stored image is deformed to take a difference in viewpoint into account.

5. The method according to claim 1, wherein, during the displaying, one of the current image and the transmitted portion of the previously-stored image is translated relative to the other so that an automatic superimposition minimizes a difference between the current image and the transmitted portion of the previously-stored image, on the point-by-point basis.

6. The method according to claim 1, wherein, during the identifier transmitting, the mobile terminal transmits at least a portion of said captured image, the server determining said identifier from the image transmitted by the mobile terminal.

7. The method according to claim 1, wherein, during the identifier transmitting, the mobile terminal determines the identifier by processing at least a portion of said captured image and transmits symbols representative of the determined identifier.

8. The method according to claim 1, wherein, during the capturing of the current image, with the communicating mobile terminal, of at least a portion of the current tag and during the identifier transmitting to the server, said identifier is comprised of at least a portion of the captured image.

9. The method according to claim 8, wherein, during the reading of the previously-stored image of the previously-captured tag having said identifier from the memory of tag images, at least a portion of the current image and at least a portion of the previously-stored image are automatically superimposed to minimize a difference between the current image and the previously-stored image.

10. The method according to claim 9, wherein, during the reading of the previously-stored image of the previously-captured tag, the portion of the current image and the portion of the previously-stored image to be superimposed are set to a same scale and orientation on the point-by-point basis, and one of the image portions is deformed to take a difference in viewpoint into account so that an automatic superimposition minimizes a difference between the current image and the previously-stored image.

11. A device for authenticating a current tag by a communicating mobile terminal, the device comprising:
   an image capturing system configured to capture a current image of at least a portion of the current tag, the captured current image comprising at least a portion of an identifier visible to the naked eye, printed on the tag, the identifier being disposed over at least two hologram elements or diffractive elements;

a transmitter configured to transmit the captured current image including said identifier to a server;

a receiver configured to receive, from the server, at least a portion of a previously-stored image read from a memory of the server and a result of a comparison of (i) the distances of each hologram element or diffractive element to regularly-spaced positions on the previously-stored image of the tag determined at the server, to (ii) distances of each hologram element or diffractive element to regularly-spaced positions on the image captured by the terminal; and a display configured to display at least a portion of the transmitted portion of the previously-stored image superimposed on the current image captured by said terminal, a superimposition image resulting from a superimposition of the current image and the transmitted portion of the previously-stored image on a point-to-point basis.

12. The device according to claim 11, wherein the display is configured to automatically superimpose the current image and the transmitted portion of the previously-stored image to minimize a difference between the current image and the transmitted portion of the previously-stored image.

13. The device according to claim 11, wherein the display is configured to identify characteristic points of the previously-captured tag and the current tag in the current image and the transmitted portion of the previously-stored image, to superimpose the characteristic elements and to set the current image and the transmitted portion of the previously-stored image to be superimposed to a same scale and orientation.

14. The device according to claim 11, wherein the display is configured to deform one of the current image and the transmitted portion of the previously-stored image to take a difference in viewpoint into account.

15. The device according to claim 11, wherein, the display is configured to translate one of the current image and the transmitted portion of the previously-stored image relative to the other so that an automatic superimposition minimizes a difference between the current image and the transmitted portion of the previously-stored image, on the point-by-point basis.

* * * * *